United States Patent
Brum

(10) Patent No.: US 6,869,645 B2
(45) Date of Patent: Mar. 22, 2005

(54) METHOD FOR PLASMA TREATMENT OF GOLF BALLS

(75) Inventor: William Brum, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 359 days.

(21) Appl. No.: 10/071,154

(22) Filed: Feb. 8, 2002

(65) Prior Publication Data

US 2003/0075526 A1 Apr. 24, 2003

Related U.S. Application Data

(63) Continuation-in-part of application No. 10/037,380, filed on Oct. 23, 2001.

(51) Int. Cl.[7] .............................. H05H 1/24; B05D 3/06; B05D 3/12
(52) U.S. Cl. ...................... 427/536; 427/569; 427/242
(58) Field of Search ............................... 427/536, 491, 427/569, 242; 118/723 E, 723 R, 716, 730, 732

(56) References Cited

U.S. PATENT DOCUMENTS

| | | | |
|---|---|---|---|
| 3,926,147 A | * | 12/1975 | Steube |
| 4,397,885 A | * | 8/1983 | Akai et al. |
| 4,600,563 A | | 7/1986 | Diederich ............... 422/186.29 |
| 4,613,403 A | | 9/1986 | Oyachi et al. .............. 156/643 |
| 4,859,493 A | * | 8/1989 | Lemelson ................... 427/562 |
| 4,911,812 A | | 3/1990 | Kudo et al. ............ 204/192.32 |
| 5,126,164 A | | 6/1992 | Okazaki et al. ................ 427/39 |
| 5,316,739 A | | 5/1994 | Yoshikawa et al. .... 422/186.05 |
| 5,370,737 A | * | 12/1994 | Mathis ................... 118/723 E |
| 5,466,424 A | * | 11/1995 | Kusano et al. ............. 427/569 |
| 5,591,268 A | * | 1/1997 | Usui et al. ............... 118/723 E |
| 5,601,883 A | * | 2/1997 | Yamazaki ................... 427/577 |
| 5,895,586 A | * | 4/1999 | Kaji et al. .............. 118/723 R |
| 5,988,103 A | * | 11/1999 | Fetherson et al. ....... 118/723 E |
| 6,060,129 A | * | 5/2000 | Thomas et al. ............. 427/490 |
| 6,368,676 B1 | * | 4/2002 | Gaudreau et al. .......... 427/569 |

* cited by examiner

Primary Examiner—Marianne Padgett
(74) Attorney, Agent, or Firm—D. Michael Burns

(57) ABSTRACT

The present invention relates to an improved apparatus for plasma treatment of golf ball surface. The improved apparatus comprises a cylindrical basket shaped rotating tumbler made from aluminum sheet metal that holds a plurality of golf balls within a sealed casing for surface preparation. A staggered hole pattern yields about 57% of open area in the tumbler surface to insure evacuation with minimum resistance. The holes are individually machined and have machined radiuses at each side of the sheet metal to allow for adequate coverage of a hard anodic coating which is necessary for protection of the sheet metal from the high intensity plasma. A two stage dry vacuum pumping system is used to reduce hydrocarbon impurities and improve print and paint adhesion.

6 Claims, 4 Drawing Sheets

METHOD FOR PLASMA TREATMENT OF GOLF BALLS

CROSS REFERENCE TO RELATED APPLICATIONS

This application is a continuation-in-part of U.S. patent application Ser. No. 10/037,380, filed Oct. 23, 2001.

FIELD OF THE INVENTION

The invention relates to an improvement in the apparatus for treating the surface of golf balls with unpolymerizable gas plasma. More specifically, the improvement is a rotating tumbler having a dry vacuum pumping apparatus.

BACKGROUND OF THE INVENTION

Conventional golf balls can be divided into two general types or groups: solid balls and wound balls. The difference in play characteristics resulting from these different types of construction can be quite significant.

Balls having a solid construction are generally most popular with the average recreational golfer because they provide a very durable ball while also providing maximum distance. Solid balls are generally made with a single solid core, usually made of cross-linked rubber, which is encased by a cover material. Typically the solid core is made of polybutadiene which is chemically cross-linked with zinc diacrylic and/or similar cross-linking agents and is covered by a tough, cut-proof blended cover. The cover is generally a material such as SURLYN®, which is a trademark for an ionomer resin produced by DuPont. Wound balls typically have either a solid rubber or liquid center core around which many yards of stretched elastic such as Balata or polyurethane are wound. Wound balls are generally softer and provide more spin, which enables a skilled golfer to have control over the ball's flight and final position.

Regardless of the form of the ball, players generally seek a golf ball that delivers the best combination as to maximum distance, spin and durability. Golf ball manufacturers are continually searching for new ways in which to provide golf balls that deliver the maximum performance for golfers at all skill levels.

The outer cover of either type golf ball are formed with various materials that may be thermoplastic urethane elastomers, Balata, ionomers (which are metallic salts of copolymer of ethylene and an acid precursor), Surlyn® blends or any other appropriate materials. The cover surfaces are formed with dimples of various numbers, sizes and patterns, which improve flight distance, control and stability. The outer surface of the ball covers usually have the manufacturers indicia disposed thereon as well as an application of a paint or clear lacquer for the purposes not only of good appearance but also of improving fight distance and protecting of the indicia imprinted thereon.

The coatings are often subject to exfoliation due to strong impact with a golf club, which not only can mar the appearance of the ball, but can adversely affect the distance and stability of the ball flight. This exfoliation can be reduced by improved adhesion techniques between golf ball cover surface and coating.

In order to improve adhesive bonding between the outer surface of the cover and the applied coating, many methods have been tried and administered. One process is the flame method. Used with golf balls this has presented a problem because of the heat generated, which can scorch the ball or cause burns to the inner polymer materials. Sand blasting is another technique for roughing up the ball, but again, this can be unsatisfactory in that precisely designed and formed dimples can be damaged. One method that has helped reduce product defects of the above nature involves treating the organic cover material of the golf ball with glow discharge plasma of unpolymerizable inorganic gas to advantageously modify the surface of the cover. A coating is then applied in an apparatus adapted to expose the all over surface of the ball to the plasma. The so-called glow plasma can be generated by applying high voltage to the gas at a low temperature of about 20° C. under a low pressure in the range of 100–200 mm Torr, more preferably 200 mm Torr. Such a method is described in U.S. Pat. No. 4,613,403 issued to Oyachi et al.

The glow discharge plasma method for treating golf balls requires the use of an apparatus that incorporates a rotating tumbler that simultaneously contains and moves a plurality of golf balls while they are being subjected to the glow discharge.

A significant problem is inherent in the make-up of conventional tumbler apparatus. Tumblers must be rigid to withstand handling thousands of golf balls per batch. They also should be designed to promote an even distribution of plasma discharge generated at about 13.56 MHz and 1200 Watts. They must allow a fast pump-down time for production efficiency. They must rotationally tumble golf balls without marking or marring them while constantly exposing the ball surfaces. A major problem with prior art tumblers is that the plurality of holes in the surfaces of these tumblers are created by a shearing process which results in holes having sharp edges on each side of sheet. The size of the holes is also of great importance as holes that are too small may severely stall the evacuation process. And holes that are too large may allow the surface of the ball to become lodged therein, whereby the ball will not move freely and thereby not receive an even coat of plasma. The holes themselves are subject to the high intensity plasma and holes that are made by the shearing method may have sharp ridges. Hole geometry of this type makes it very difficult to apply the proper anodic protective coating, and in time the plasma will erode the unprotected hole and its edges causing pitting, nicks, and other irregularities. Golf balls contacting these problem areas will be subject to marking and other potential product defects. The golf balls of the prior art are also exposed to contamination from the oil in the vacuum system. The present invention describes an apparatus that dramatically reduces, if not totally eliminates, product damage caused by these type of tumblers.

SUMMARY OF THE INVENTION

The present invention is directed to an improved rotating tumbler for holding golf balls during a treatment with glow discharge plasma of high intensity. The plasma is applied under conditions of low pressure of about 100 to 200 mm Torr and high voltage (13.56 MHz with an output of about 1200 Watts). The improved apparatus utilizes a hole pattern that gives the tumbler improved stability. This hole design that will allow a protective hard anodic coating to be applied at the hole edges so that ball marking and defects will be minimized. And properly sized holes will allow for speedy evacuation and more stable tuning frequency.

One embodiment of the invention will create the low pressure of 10 milli-torr or less by a multi-stage pumping system which will effectively isolate all lubrication oil from the swept volume of the vacuum pump thereby improving print and paint adhesion of the ball surface.

An embodiment of the invention is a tumbler utilizing a cylinder of aluminum sheet metal having a plurality of individually machined holes in a staggered pattern, one end of the cylinder being enclosed with a generally circular sheet of aluminum that also includes a staggered hole pattern. The other end of the cylinder remains open for the transportation of golf balls into and out of the tumbler. The pattern of holes is designed to generate stability during the tumbling operation.

The tumbler of the present invention is hard anodic coated for protection against the rigors of the plasma process. Each hole further having a radius machined about the outer ridges of the holes to facilitate the application of the anodic coating at these locations and to remove any sharp edges that may mark or defect the golf balls.

The present invention is also directed towards having the size of the holes of specific diameter. The diameters of the holes should be between 0.25 inches and 0.50 inches, and more preferably about 0.375 inches, with the radius at the hole edges about 0.09 inches. The holes should be large enough to allow for a quick evacuation with minimal resistance, but not so large that they will nestle with the ball thereby preventing an even coating of plasma to the ball surface. The number and allocation of holes should be such that more than 50% of the tumbler surface is open surface. The pattern of holes of the invention which is generally 0.375 inch holes on a staggered line of 0.75 inches provides for about 57% of open surface area which produces an evacuation time of less than 60 seconds.

The interior of the holes are also subject to the high intensity plasma and as such can possibly create an unstable process that requires frequent tuning of the radio frequency. The size and design of the holes of the present invention promotes a stable process with only infrequent tuning required.

DESCRIPTION OF THE PREFERRED EMBODIMENTS

The plasma treatment of a golf ball surface relies heavily on a clean ball surface. Any contamination of the surface will act to reduce the effect of plasma. External to the plasma treatment chamber the ball surface can be washed and rinsed of debris. Internal to the chamber the vacuum pump is a potential source of contamination. Typically, plasma discharge generation is accomplished using an oil based rotary vane pump. The presence of oil within the swept volume creates several problems in critical cleaning operations. Specifically, as the chamber pressures reach low pressure operating ranges, this will tend to cause oil vapor to back stream through the vacuum system. These oil molecules ultimately find their way into the chamber and onto the golf ball surface.

Figure 1:
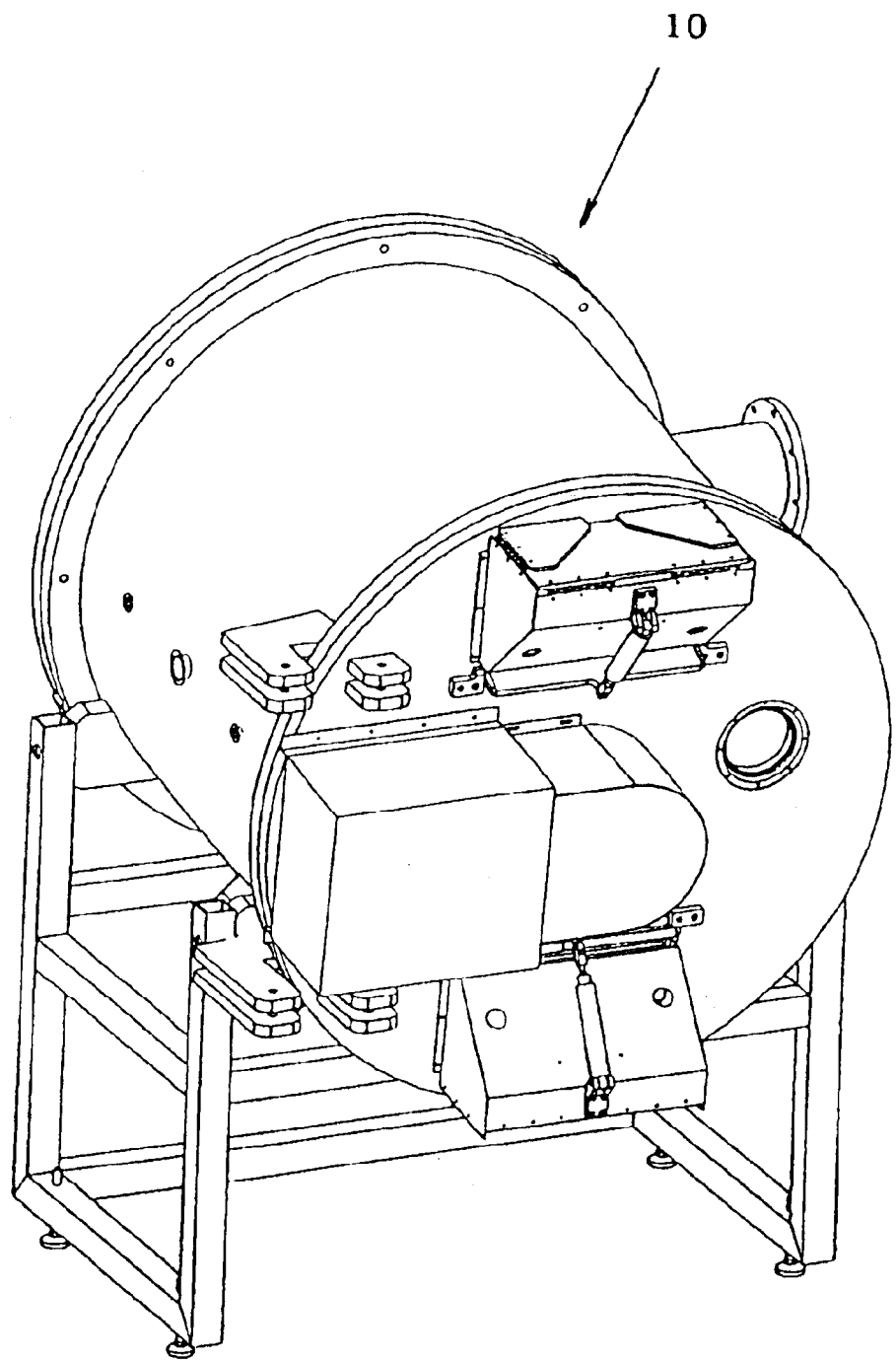
FIG. 1 is a pictorial view showing a surface-treating plasma barrel reactor used in the present invention.
Figure 2:
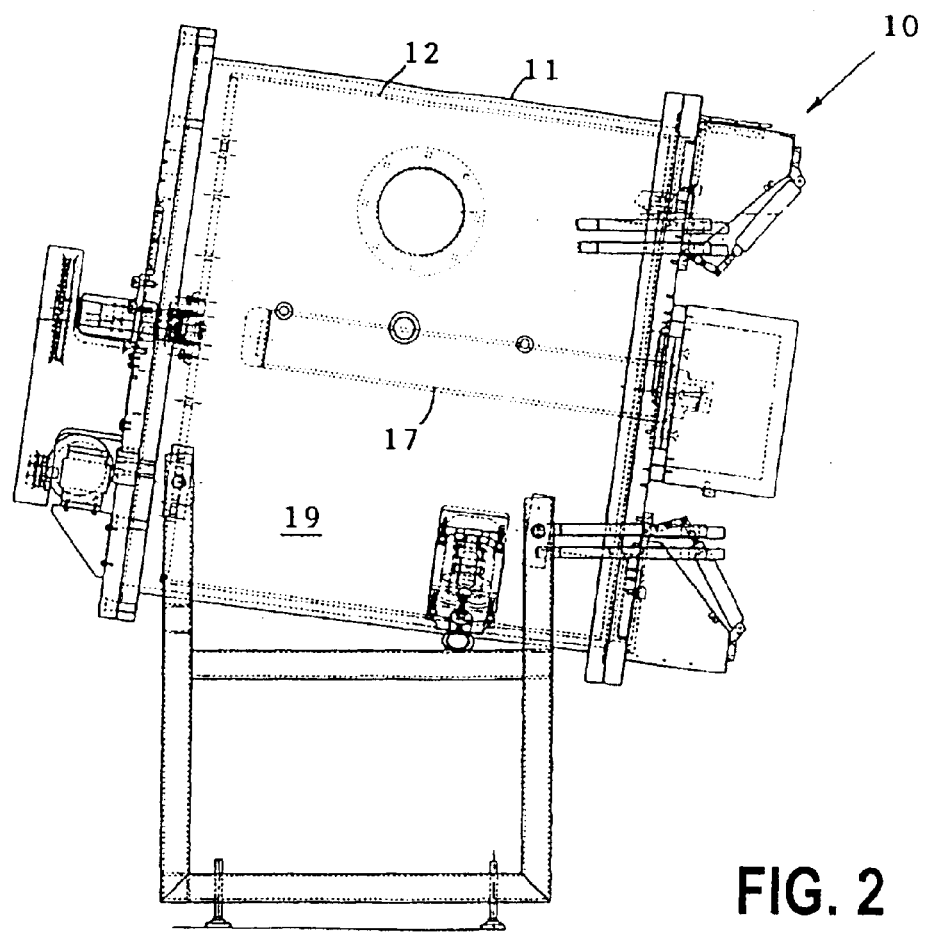
FIG. 2 is an elevational sectional side view of FIG. 1
Figure 3:
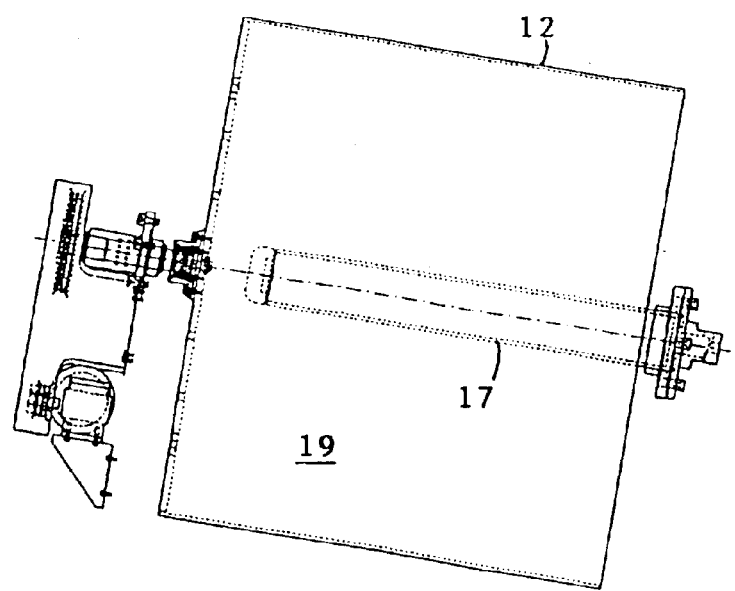
FIG. 3 is an elevational sectional view of the casing of FIGS. 1 and 2 specifically detailing the rod member.
Figure 6:
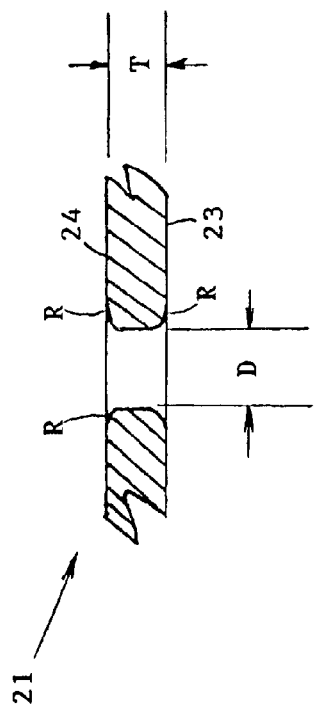
FIG. 6 is a cutout view of one of the holes in the tumbler.

Referring to FIG. 1, there is shown a known plasma barrel reactor 10. FIG. 2 illustrates a reactor 10 having a generally barrel-like, cylindrical casing 11 with a generic internal tumbler 12 that is adapted to receive a plurality of articles, preferably golf balls 13. The reactor 10 is equipped with conventional means for supplying power, gases, etc., for which a schematic is shown in FIG. 6 and discussed in detail below. FIG. 3 shows tumbler 12 including a plasma generation rod 17 and chamber 19 for holding golf balls (not shown). In the tumbler 12 golf balls are subjected to being surface-treated by a gas plasma process. This treatment is a necessary step in the preparation of the golf ball surface for an application that may comprise either a coat of paint or clear lacquer. Tumbler 12 is caused to rotate within the sealed casing 11 thereby constantly keeping golf balls in motion so that they may all receive an even distribution of plasma discharge upon their surfaces.

Figure 7:
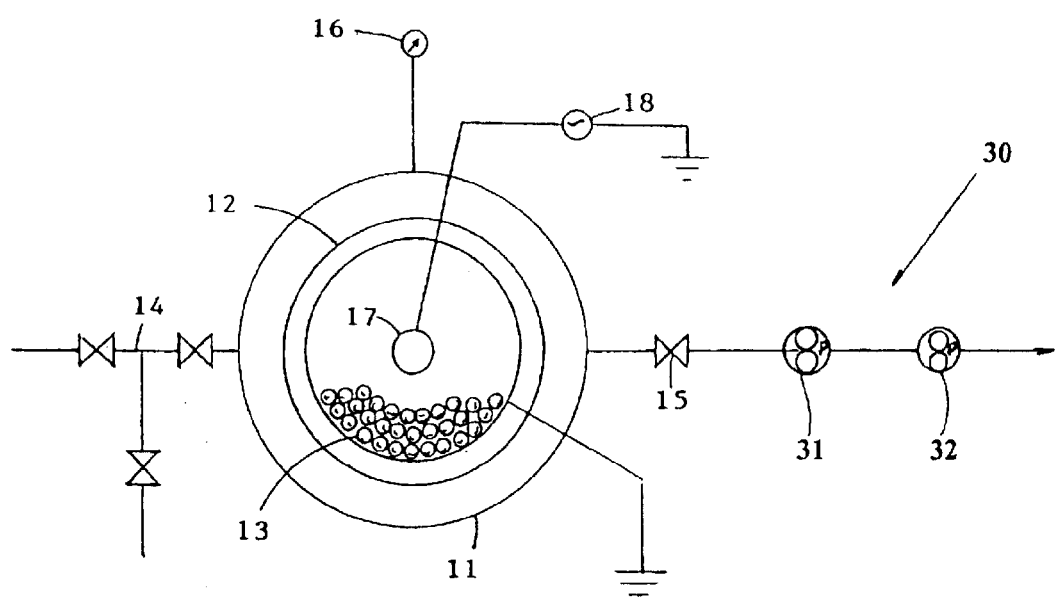
FIG. 7 is a schematic diagram of the surface-treating apparatus including the two-stage dry pumping system.

FIG. 7 is a schematic layout of reactor 10 showing a plurality of ports for introducing and exhausting the working gases, and the location of golf balls 13 within the tumbler 12. Valve means 14 provides for in-letting of gases into and out of the casing 11, so as to maintain a desired volume of gas therein. A valve means 15 is arranged in a line to be led to a two-stage dry vacuum pumping system 30, for decreasing pressure in the casing 11. A vacuum gauge 16, tumbler 12 for holding the golf balls 13 therein, a glow discharge plasma rod 17, and an electric source 18 make up the remaining working components of the apparatus.

The method for treating golf balls 13 with glow discharge plasma is described in U.S. Pat. No. 4,613,403, issued to Oyachi et al., which is incorporated in its entirety herein. The covers of the balls 13 are usually made of various materials that may be thermoplastic urethane elastomers, Balata, ionomers, Surlyn® blends or any appropriate materials. The outer cover surface of the balls 13 is usually coated with a paint or clear lacquer, not only for the purposes of improving flight distance and stability of ball flight, but also for good appearance. In order to improve the adhesive bonding between outer surface of the ball cover and the coating, the golf ball 13 is treated with unpolymerizable gas plasma prior to coating. The glow discharge plasma can be generated by applying high voltage from source 18 to the gas provided from a gas source through valve 14 at a low temperature of about 20° C. and under a low pressure in the range of 100–200 mTorr, more preferably 200 mTorr. The unpolymerizable inorganic gas used herein is preferably oxygen.

The two-stage dry vacuum pumping system 30 is designed to reduce the inherent impurities caused by hydrocarbon contamination from vacuum pumps that utilize oil sealed systems. These impurities reduce the print and paint adhesion of the golf ball 13 surface. Since a medium to high vacuum is required within the sealed chamber 19 to create an effective plasma discharge, a vacuum pump must be directly connected to the sealed chamber 19. In order to achieve the approximate vacuum level, typically about 200 milli-torr or less, a multi-stage pumping system is required. The first stage 31 is a roughing pump designed to achieve about 1 torr and operate within a viscous flow regime. The second stage 32 is the primary pump and is required to further reduce vacuum levels to about 10 milli-torr or less and designed to operate within a molecular flow regime. Both the first stage pump 31 and the second stage pump 32 utilize a dry swept volume to create a high purity vacuum.

The first stage pump 31 consists of two intermeshing rotors designed to extremely close tolerance. The rotor action acts to create an effective vacuum. The mechanical gears and bearings within the pump are effectively sealed from the chamber 19, thereby essentially isolating all lubricating oil in the pump.

The second stage pump 32 consists of multi-stage rotor mechanisms designed to achieve effective vapor handling and generate a high vacuum. The swept volume of this second stage pump 32 is also fully isolated from the lubricated drive mechanisms required to drive the rotors. Since the vacuum is created in a dry swept volume, the possibility of oil contamination of the golf ball 13 is essentially eliminated. The mechanisms of the pumping system 30 are not shown, as the system is well known to those in the art. It is a design based on Roots technology as originated by the Roots Connersville Company.

EXAMPLE

A plurality of balls 13 are held in the tumbler 12 and air is discharged by actuation of the pressure reduction valve 15, so as to make the pressure about 0.002 Torr. Then the inorganic gas is supplied into the casing 11 by actuating the valve 14 in order that the pressure is therein increased to be about 100 Torr. The tumbler 12 is rotated under a high frequency voltage from source 18 of about 10 to 15 MHz with an output in the range of about 900 to 1500 Watts being applied across electrodes. The electrodes consist of a plasma rod 17, which is longitudinally centered in the middle of the tumbler, and the casing 11. Golf balls 13 are therein treated with inorganic gas plasma for a relatively short period of time preferably between 6 to 10 minutes until every ball is coated with plasma discharge.

Figure 4:
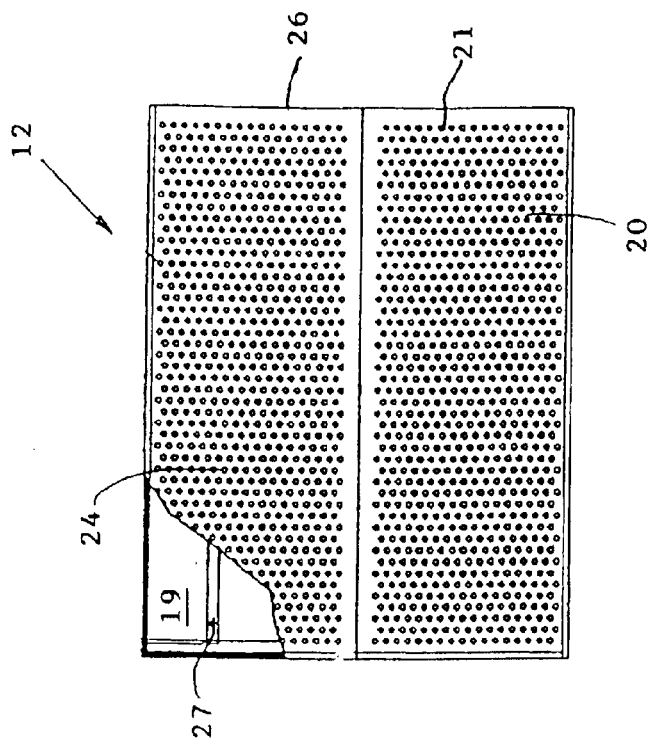
FIG. 4 is a partial longitudinal sectional view of the tumbler portion showing the hole pattern and arrangement.
Figure 5:
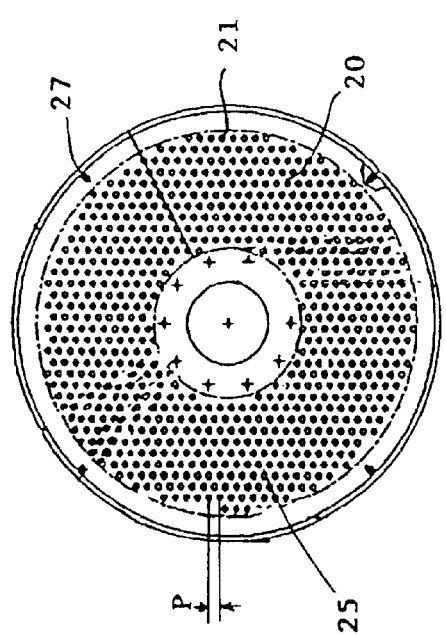
FIG. 5 is an elevational end view of FIG. 3.

The present invention, as shown in FIGS. 4 and 5, provides for an improvement in the apparatus for carrying out the above procedure. The tumbler 12 must be rigid, and allow for the balls 13 to roll free. However, it must also provide a chamber environment that prevents marring or marking of the golf ball 13.

A standard perforated aluminum sheet 20 with a pattern of holes 21 is formed into a cylindrical basket. This pattern of holes 21 is preferably not created by means of a shearing process, which results in holes that contain sharp edges on each side of the sheet, but rather each hole 21 is individually machined. A plurality of ribs 27, longitudinally disposed, provide structural integrity to the tumbler 12 and for increased agitation of golf balls 13. The interior surface 22 and exterior surface 23 of the tumbler 12 are sandblasted and hand polished to remove any rough edges. The ribs 27 are perpendicular to the tumbler 12 and are about 0.5 to 2 inches in depth. Holes 21 each have a through open diameter (D) between about 0.25 inches to about 0.50 inches, preferably about 0.375 inches of through opening. Holes 21 are positioned for maximum workable open area and as such holes 21 of 0.375 inches diameter are machined on a staggered pattern (P) of about 0.75 inches. The pattern is selected so as to yield about 57% open surface area in tumbler 12, which allows for quick evacuation (less than about 60 seconds) with minimal resistance. One embodiment of the invention has a tumbler capacity of 1200 golf balls 13 which requires improved tumbler design to insure that each ball 13 receives an even and adequate exposure of glow plasma discharge. The tumbler 12, as are holes 21, are subjected to high intensity plasma, and for protection the tumbler 12 is hard coat anodized with about 0.003 inches applied for abrasion resistance (per mil spec. MIL-A8625F Class III). The aluminum sheet 20 has a thickness (T) of about 0.250 inches to about 0.375 inches thick and, as previously stated, fabricated with a pattern of holes around the circumference and rear face 25 to the cylinder. The front face 26 of the cylinder is open to allow for product transport to and from the tumbler 12.

During the process in which the anodic protective coating is applied, the relatively rounded edges of the holes 21 assist in providing an even application of the coating and also an adequate thickness. When the plasma generator is activated, high intensity plasma is generated within each hole 21. The effect of the plasma within the hole 21 would cause eroding of aluminum metal which has not been adequately protected by a hard anodic coating. This could result in a burnt effect at the edge of the hole 21. The surface of the golf ball 13 making contact with the edges of the eroded holes edge causes substantial contamination and marking of the ball 13. Thus rounding of edges is important, preferably edges have a radius of between 0.06 inches and 0.12 inches and more preferably about 0.09 inches.

The size of the openings of the hole 21, in addition to their function to provide quick evacuation time, is also important for maintaining a consistency in radio frequency tuning. The presence of high intensity plasma within the holes 21 can create an unstable process that necessitates frequent tuning. This situation is accentuated by the size of the hole. The smaller the hole the greater the instability and therefore more tuning.

An embodiment of the invention provides protection against eroding of the hole 21 edges by machining each hole, on interior and exterior surfaces, to a diameter of about 0.375 inches with a radius (R) of about 0.09 inches as shown in FIG. 6. This inherently removes any sharp edges and presents an adequate surface area on the ridges of the holes 21 to allow a protective anodic coating to be applied. The coating subsequently protects against erosion at the ridges of the holes 21 which is the principal reason for ball marking and other defects during the process.

The pattern of holes geometry is such that the holes are in a staggered arrangement and measure 0.75 inches apart from each other based on a measurement from the center of any one hole to the center of an adjacent hole. By the employment of this specific pattern of hole geometry to the tumbler 12, the present invention improves upon known tumblers and meets several objectives. First it provides an apparatus that will improve evacuation times. It then will reduce radio frequency tuning. Efficiently apply an even coat of glow plasma discharge. Next, reduce overall equipment maintenance. And finally, reduce, if not eliminate, product marking and defects.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

I claim:

1. A method for treating a plurality of non-coated golf ball surfaces, the method comprising the following steps in the order named:

providing a sealed casing having a rotational tumbler having a chamber disposed therein, the casing providing an electrode;

providing a plasma discharge rod disposed within the tumbler, the rod providing another electrode;

placing a plurality of untreated golf balls within the chamber;

drawing an oil free vacuum of about 1 torr in a first stage, and then in a second stage to about 10 mtorr or less within the sealed casing;

supplying an inorganic gas into the casing wherein the pressure is raised to about 100 to 200 mtorr;

applying an electrode voltage across the electrodes to create an unpolymerizable gas plasma discharge upon the plurality of golf ball surfaces; and rotating the tumbler such that movable surfaces of the plurality of golf balls within the tumbler receive an even exposure of plasma discharge, wherein the oil free vacuum system effectively isolates all lubricating oils from contact with the surface of the golf balls.

2. The method for treating a plurality of uncoated golf ball surfaces according to claim 1, in which the rotational tumbler is a cylindrical basket having a plurality of perforated holes in a staggered pattern covering a substantial portion of the basket surface.

3. The method for treating a plurality of uncoated golf ball surfaces according to claim 2, wherein the staggered pattern yields an open hole surface area greater than 50 percent.

4. The method for treating a plurality of uncoated golf ball surfaces according to claim 2, wherein the plurality of perforated holes have a through diameter greater than that about 0.25 inch and less than about 0.50 inch.

5. The method for treating a plurality of uncoated golf ball surfaces according to claim 2, wherein the plurality of perforated holes have a curved radius machined about their outer edges.

6. The method for treating a plurality of uncoated golf ball surfaces according to claim 5, wherein the curved radius is about 0.06 to 0.12 inch.

* * * * *